United States Patent [19]

Powell

[11] Patent Number: 5,025,585
[45] Date of Patent: Jun. 25, 1991

[54] FISHING LINE CUTTER

[75] Inventor: Timothy R. Powell, 2621 40th Ave. N., Texas City, Tex. 77590

[73] Assignee: Timothy Powell

[21] Appl. No.: 453,823

[22] Filed: Dec. 21, 1989

[51] Int. Cl.$^5$ ............................................. A01K 87/00
[52] U.S. Cl. ......................................... 43/25; 30/286
[58] Field of Search ...................... 43/25; 30/278, 280, 30/286, 2, 289, DIG. 3, DIG. 8

[56] References Cited

U.S. PATENT DOCUMENTS

| | | | |
|---|---|---|---|
| 1,851,370 | 3/1932 | Munger | 43/25 |
| 2,171,050 | 8/1939 | Slawson | 30/317 |
| 3,128,023 | 4/1964 | Cook | 43/25 |
| 3,781,988 | 1/1974 | Jones | 30/286 |
| 4,023,299 | 5/1977 | Maserang et al. | 43/25 |
| 4,711,031 | 12/1987 | Annello | 30/2 |
| 4,726,140 | 2/1988 | Mears | 43/25 |
| 4,730,409 | 3/1988 | Mitchell et al. | 43/25 |
| 4,744,146 | 5/1988 | Schmidt | 30/286 |
| 4,823,498 | 4/1989 | Banta | 43/25 |
| 4,896,422 | 1/1990 | Sheehan et al. | 43/25 |

FOREIGN PATENT DOCUMENTS 0463963 3/1950 Canada ................................. 43/25

Primary Examiner—Kurt Rowan
Assistant Examiner—James Minen
Attorney, Agent, or Firm—Guy McClung

[57] ABSTRACT

A fishing line cutter, a fishing rod with a fishing line cutter, and a fishing reel with a fishing line cutter. In one embodiment of a fishing line cutter according to this invention, the cutter has a body, a sharp edged member for cutting line mounted to the body, and a plurality of fingers extending from the body to facilitate attaching the cutter to a fishing rod. In another embodiment, a cutter has dual opposed cutting edges. Another type of cutter has a shield which is movable to expose a cutting blade. In another embodiment, a cutter has a retractable blade. In another embodiment a cutter has overlapping protective fingers past which a line passes prior to cutting. In another embodiment, part of the body member is movable to permit blade replacement.

3 Claims, 4 Drawing Sheets

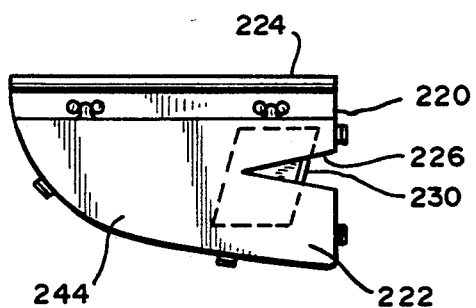
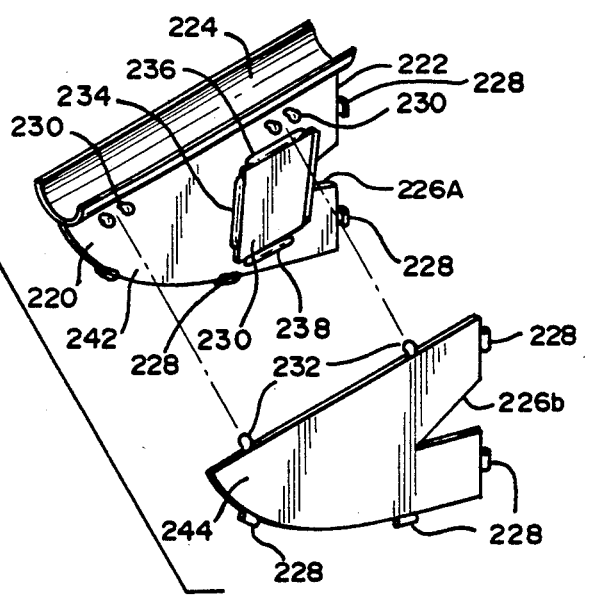
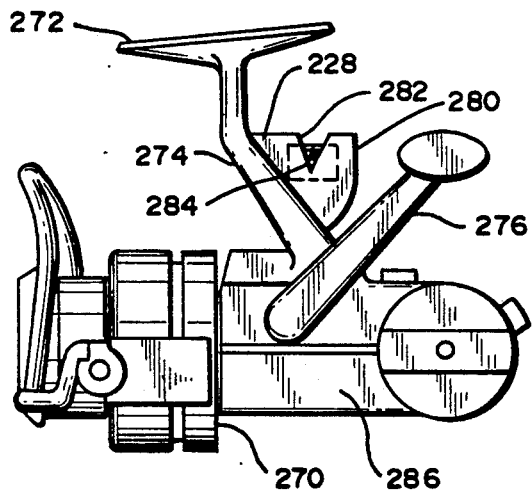
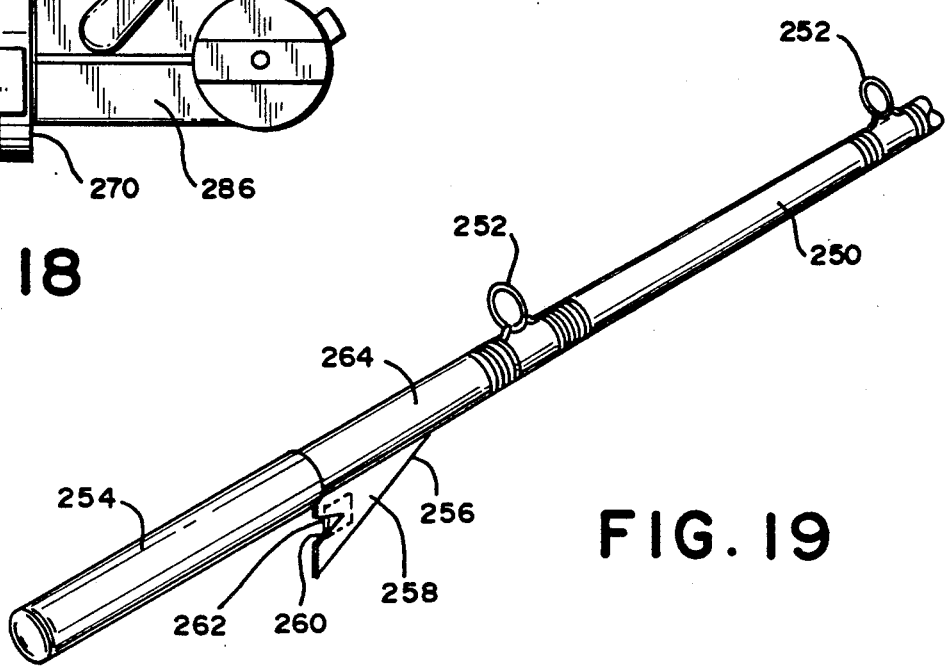

FISHING LINE CUTTER

BACKGROUND OF THE INVENTION

1. Field of the Invention

This invention is directed to fishing line cutters. In one particular embodiment it is directed to a fishing line cutter which is removably attachable to a fishing rod.

2. Description of Related Art

In accordance with 37 C.F.R. 1.56, the following are disclosed and copies are submitted herewith.

U.S. Pat. No. 2,171,050 discloses a cutting device which affixed to an end of a fishing rod for cutting a branch in which a fish hook or lure has become entangled.

U.S. Pat. No. 3,128,023 shows a fishing line cutter which employs a blade exposed at several points and which is attachable to a fishing rod.

U.S Pat. No. 4,726,140 illustrates a fishing line cutter which employs a razor blade and is attachable to a fishing rod using Velcro TM material.

U.S. Pat. No. 4,730,409 discloses a fishing line cutter with a tubular member for snapping on a fishing rod.

U.S Pat. No. 4,823,498 discloses a fishing line cutter with a sharpening stone which has a base mountable on a fishing rod.

There has long been a need for an effective and efficient rod-mountable fishing line cutter. There has long been a need for such a cutter which is quickly removable from a rod. There has long been a need for a fishing line cutter which can be used safely, minimizing the chance of injury to the user.

SUMMARY OF THE PRESENT INVENTION

The present invention is directed to a fishing line cutter. In one embodiment a fishing line cutter according to this invention has a body member to which is mounted an implement with a sharp edge or edges for cutting fishing line. In one embodiment of such a cutter the body member has projections thereon for facilitating the mounting of the cutter on a fishing rod. In another embodiment a cutter is provided in which the cutting edge or edges are protected by some type of shield means. In another embodiment of a fishing line cutter according to this invention the member with the sharp edge or edges is movably disposed in the cutter so that it can be exposed for cutting and retracted when not in use. In another embodiment a cutter is provided which allows tension to be safely applied to line to be cut. Other embodiments of fishing line cutters according to the present invention include a variety of features from the various embodiments already discussed.

It is, therefore, an object of the present invention to provide a new, useful, safe, unique, efficient, and nonobvious fishing line cutter.

Another object of the present invention is to provide a fishing line cutter with a plurality of cutting edges.

Yet another object of the present invention is the provision of a fishing line cutter with a shielded cutting edge.

A further object of the present invention is the provision of such a cutter in which the shield is movable.

An additional object of the present invention is the provision of a fishing line cutter with protectors so that tension can be safely applied to the line to assist in cutting the line.

Another object of the present invention is the provision of a fishing line cutter which can be efficiently connected to a fishing rod and quickly disconnected if desired.

A further object of the present invention is the provision of a fishing line cutter with a retractable cutting implement which can be exposed as desired.

Yet another object of the present invention is the provision of a fishing line cutter with a protected blade which is less susceptible to corrosion.

The present invention recognizes and addresses the previously-mentioned unaddressed long-felt needs and provides a satisfactory meeting of those needs in its various embodiments. To one of skill in this art who has the benefits of this invention's teaching and disclosures, other and further objects and advantages will be clear, as well as others inherent therein, from the following description of presently-preferred embodiments, given for the purpose of disclosure, when taken in conjunction with the accompanying drawings. Although these descriptions are detailed to insure adequacy and aid understanding, this is not intended to prejudice that purpose of a patent which is to claim an invention no matter how others may later disguise it by variations in form or additions or further improvements.

DESCRIPTION OF THE DRAWINGS

So that the manner in which the above-recited features, advantages and objects of the invention, as well as others which will become apparent, are attained and can be understood in detail, more particular description of the invention briefly summarized above may be had by reference to certain embodiments thereof which are illustrated in the appended drawings, which drawings form a part of this specification. It is to be noted, however, that the appended drawings illustrate preferred embodiments of the invention and are not to be considered limiting of its scope, for the invention may admit to other equally effective equivalent embodiments.

FIG. 16 is a side perspective view of a fishing line cutter according to the present invention.

FIG. 17 is another view of the cutter of FIG. 16 showing one shield piece removed.

FIG. 18 is a side perspective view of a reel according to the present invention.

FIG. 19 is a perspective view of a rod according to the present invention

DESCRIPTION OF PREFERRED EMBODIMENTS

Figure 1:
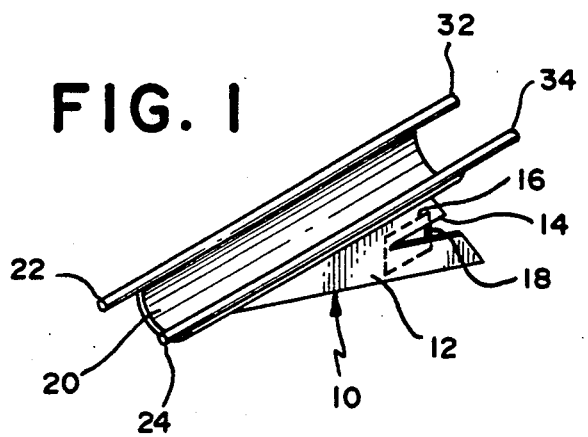
FIG. 1 is a perspective view of a fishing line cutter according to the present invention.

As shown in FIG. 1 a fishing line cutter 10 according to the present invention has a body member 12. The body member 12 has a curved member 20 connected thereto which conveniently lies against a fishing rod. A blade 16 with a sharp edge 18 is mounted in the body member 12 and notch 14 in the body member 12 exposes the blade's sharp edge. The notch 14 is in one end of the body member 12. Rods 36,38 are connected to the curved member 20. Finger projections 22,24,32,34 extend from the rods 36,38 curved member 20 and provide means to which a strap (e.g. string, fish line, elastic band, surgical tube) can be connected to attached the cutter 10 to a rod.

Figure 2:
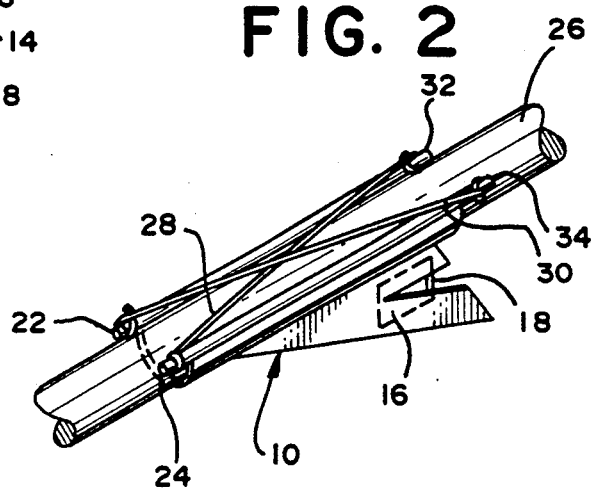
FIG. 2 shows the cutter of FIG. 1 on a fishing rod.

As shown in FIG. 2 the fishing line cutter 10 is attached to a fishing rod 26. The curved member 20 is emplaced against the rod 26. Strap means such as surgical rubber tubes 28,30 are tied or connected across the rod by means of the finger projections 24,32 (tube 28) and 22,34 (tube 30).

Since the notch 14 is at one end of the cutter 10, when the cutter is positioned on a rod so that the notch faces forwardly a line from the rod tip can be placed around the cutter with the line on the notch and a rearward pull on the line will cut the line.

Figure 3:
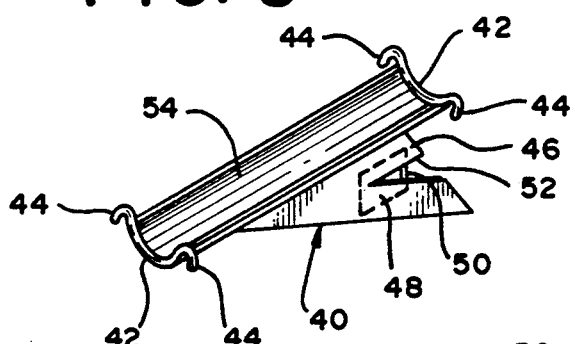
FIG. 3 is a perspective view of a fishing line cutter according to the present invention
Figure 4:
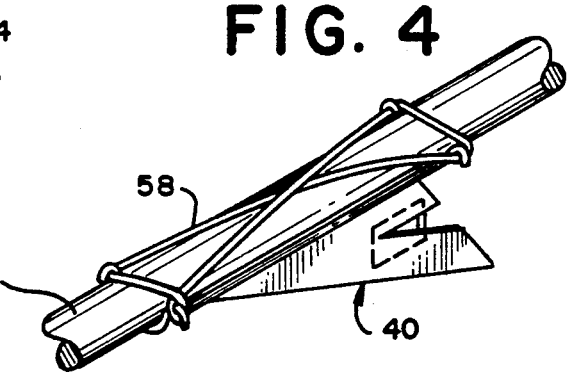
FIG. 4 shows the cutter of FIG. 3 on a rod.

As shown in FIG. 3, a fishing line cutter 40 according to the present invention has indented members 42 with projections 44 which permit connection of the cutter 40 to a rod. The cutter 40 has a body 46, a blade 48 with a sharp edge 50 exposed in a notch 52, and a curved member 54. As shown in FIG. 4 the cutter 40 is attached to a rod 56 by an elastic band 58 which crosses between and engages the projections 44.

Figure 5:
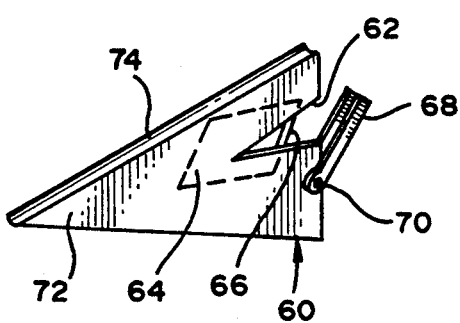
FIG. 5 is a perspective view partially cutaway of a fishing line cutter according to the present invention.

A cutter 60 illustrated in FIG. 5 has a body member 72 with a curved member 74 for emplacement against a rod body. The cutter 60 may be glued to a rod with a suitable adhesive or Velcro ™ or other connection means described herein may be added to it. A notch in the body member 72 exposes a sharp edge 66 of a blade 64 mounted to the body member 72. The blade may be mounted on the side of or within the body member 72. A cover or shield 68 is movably disposed so that it can close off the opening of the notch 62 thereby preventing access to the sharp edge 66 of the blade 64. The cover 68 pivots about pivot 70 extending through the body member 72.

Figure 6:
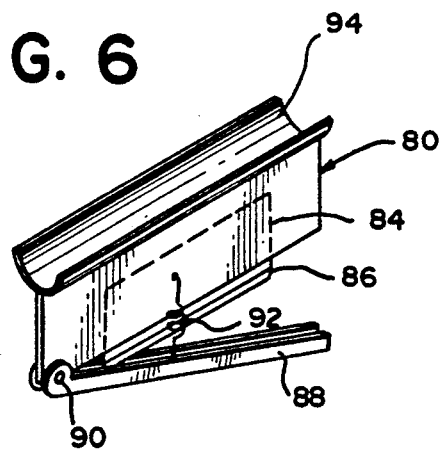
FIG. 6 is a perspective view partially cutaway of a fishing line cutter according to the present invention.

As shown in FIG. 6 a cutter 80 has a body 82 and a blade 84 with a sharp edge 86 mounted to it. A shield 88 is pivotably mounted at pivot 90 to the body 82. A spring 92 is connected to and between the shield 88 against the body 82 so that the shield 88 stays in positions against the edge 86 when the cutter 80 is not in use. A curved member 94 facilitates emplacement of the cutter 80 on a fishing rod.

Figure 7:
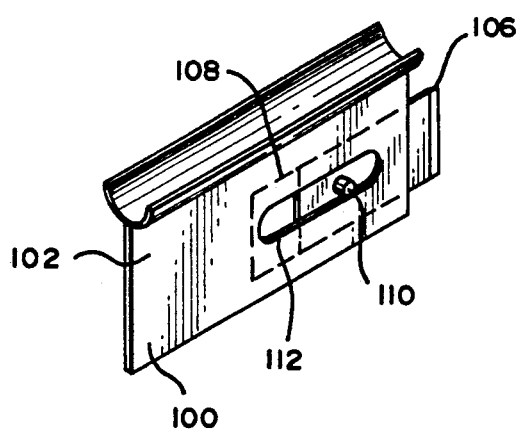
FIG. 7 is a perspective view partially cutaway of a fishing line cutter according to the present invention.

A cutter 100 shown in FIG. 7 has a body 102 and a curved member 104. A blade 106 is movably disposed on or in (preferably in) a recess 108 in the body 102. A pin 110 on the blade 106 which extends out through a recess 112 in the body 102 facilitates movement of the blade 106.

Figure 8:
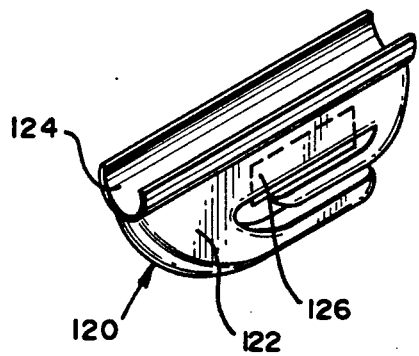
FIG. 8 is a perspective view partially cutaway of a fishing line cutter according to the present invention.

A cutter 120 shown in FIG. 8 according to the present invention has a body 122 and a curved member 124. The curved member 124 is fashioned so that when made of appropriate material, e.g. rubber or plastic, it can clip onto a rod. This feature may be incorporated to other cutters disclosed herein.

Figure 9:
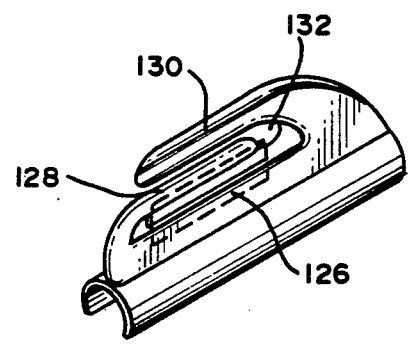
FIG. 9 is a partial side view in crosssection of the cutter of FIG. 8.

The cutter 102 has a blade 126 mounted therein for cutting fishing line. Adjacent the blade 126 is a protective finger 128 connected to the body 122 which is spaced apart from the blade 126. As shown in FIG. 9, adjacent the finger 128 is another finger 130 connected to the body 122 which overlaps the finger 128 so that line may be moved through a pathway 132 between the fingers 128,130, but an angler's fingers will not touch the blade 126. This arrangement also permits the line to be pulled between the blade 126 and the finger 128 where tension can then be applied to the line to facilitate in cutting it.

Figure 10:
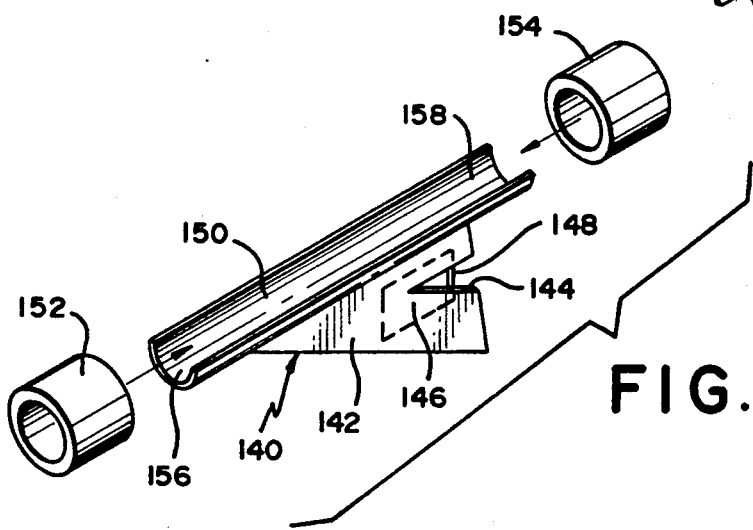
FIG. 10 is a perspective view partially cutaway of a fishing line cutter according to the present invention.
Figure 11:
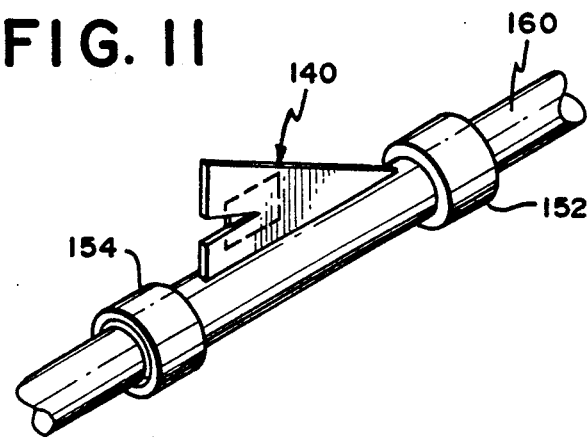
FIG. 11 is a perspective view of the cutter of FIG. 10 on a rod.

As shown in FIG. 10 a cutter 140 has a body 142, a curved member 150, and a notch 144 in which is exposed a sharp portion 148 of a blade 146. Ends 156,158 of the curved member 150 project sufficiently that pieces of tubing (e.g. rubber, elastic) can be fitted over them to connect the cutter 140 to a rod 160 as shown in FIG. 11.

Figure 12:
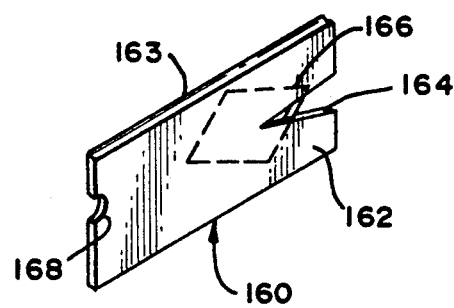
FIG. 12 is a perspective view partially cutaway of a fishing line cutter according to the present invention.

As shown in FIG. 12 a cutter 160 with a body 162, a curved member 163, and a notch 164 in which is exposed a blade 166, has a recess 168 in which a hook may be emplaced.

Figure 13:
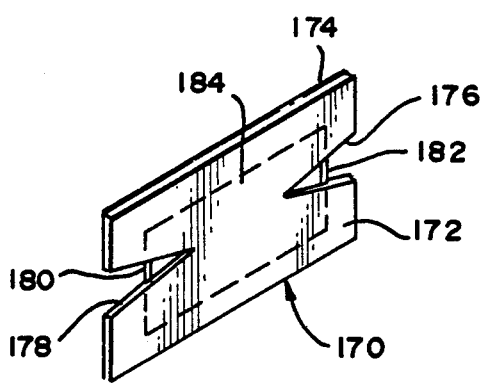
FIG. 13 is a perspective view partially cutaway of a fishing line cutter according to the present invention.

As shown in FIG. 13, a cutter 170 has a body 172, a curved member 174, and dual opposed notches 176,178 in which are exposed dual opposed sharp edges 180,182 of a blade 184 mounted in the body 172. Of course two separate blades could be used in this embodiment.

Figure 14:
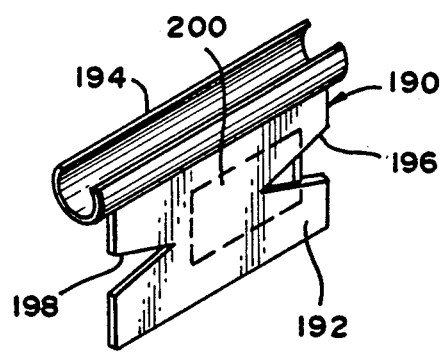
FIG. 14 is a perspective view partially cutaway of a fishing line cutter according to the present invention.

As shown in FIG 14 a cutter 190 has a body 192, a curved member 194 (like the curved member 124, FIG. 8), notches 196,198, and a blade 200 mounted in the body 192 so that it is exposed in the notch 196. Line may be pulled into notch 198 and then into notch 196 to increase tension on it for facilitating in cutting the line.

Figure 15:
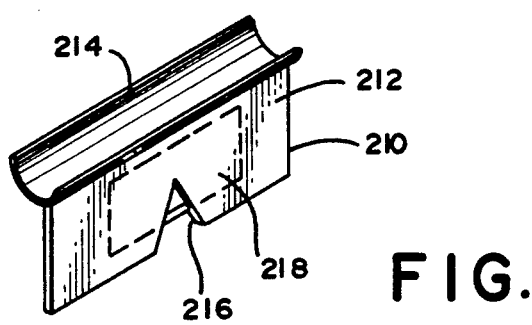
FIG. 15 is a perspective view partially cutaway of a fishing line cutter according to the present invention.

As shown in FIG. 15 a cutter 120 has a body 42, a curved member 214, and a notch 216 in the bottom of the body 212 in which is exposed a portion of a blade 218. The positioning of the notch 216 allows line to be cut with an upward (mounted on a rod bottom) or downward (mounted on top of a rod) movement of the line.

As shown in FIGS. 16 and 17, a fishing line cutter 220 according to the present invention has a body 222 with a descending body side member 242 and a body side member 244 corresponding to the member 242 is disconnectably attached to the body member 242 by means of a plurality of interengaging snaps 228 spaced around the periphery of the body side members and by means of one or more hinges 230 on the body member which engage by a snap fit buttons 232 on the member 244. Body side member 242 has a notch 226a corresponding to a notch 226b in body side member 244. A blade 230 is exposed in the notch 226a/226b and is held in place by the body side members and by ridges 234, 236, 238 on member 242. Removal of the body side member 244 permits blade replacement.

Fishing line cutters according to the present invention can be conected to or formed integrally of either a fishing rod or a fishing reel on a convenient part of the rod or reel as desired.

As shown in FIG. 18, a fishing reel 270 according to the present invention has a reel mounting base 272 with a base extension member 274 extending therefrom and disposed between the base 272 and a reel body 286. A typical reeling mechanism (not shown) is disposed within the reel body and an exterior handle 276 engages the reeling mechanism for retrieving fishing line. The reel 270 is an open faced spinning reel, but the present invention contemplates all other types of fishing reels, including but not limited to baitcasting reels, trolling reels, and closed-face spincasting reels. A fishing line cutter 228 is formed integrally of or permanently attached to the base extension 274 and has a body 280 with a notch 282 in which is exposed a sharp portion of a blade 284 which is mounted within the body 280. Although the fishing line cutter is shown on the base extension, it is within the scope of this invention for the cutter to be located on any convenient part of a reel, such as, but not limited to, the covering case of a closed-face spincasting reel or in an indentation in it. Also, it is within the scope of this invention to provide a reel with any of the variety of cutters previously described herein, including, but not limited to, the previously-described preferred embodiments.

As shown in FIG. 19, a fishing rod 250 according to the present invention has an elongated rod member 264 to which are attached a plurality of eyelets 252 for guiding fishing line. At one end of the rod 250 is a handle portion 254. Formed integrally of the rod 250 or permanently attached to it is a fishing line cutter 256 which has a body 258 with a notch 260 therein that exposes a sharp portion of a blade 262. It is within the scope of this invention for the fishing line cutter to be located at any convenient point on a rod and for any type of fishing line cutter within the scope of this invention to be employed.

In conclusion, therefore, it is seen that the present invention and the embodiments disclosed herein are well adapted to carry out the objectives and obtain the ends set forth at the outset. Certain changes can be obviously made in the apparatus without departing from the spirit and the scope of this invention. The present invention is, therefore, well adapted to carry out the objects and obtain the ends and advantages mentioned, as well as others inherent therein. While there have been described various embodiments of the present invention, the apparatuses described are not intended to be understood as limiting the scope of the invention. It is realized that changes therein are possible and it is further intended that each element recited in any of the following claims is to be understood as referring to all equivalent elements for accomplishing substantially the same results in substantially the same or equivalent manner. It is intended to cover the invention broadly in whatever form its principles may be utilized.

What is claimed is:

1. A fishing line cutter comprising
   a body member mountable to a fishing rod,
   a sharp member connected to the body member for cutting fishing line,
   overlapping projecting fingers extending from the body member and providing a pathway between them along which a line must pass prior to contacting the sharp member.

2. The fishing line cutter of claim 2 wherein part of one of the overlapping projecting fingers is disposed adjacent a portion of the sharp member so that fishing line can be pulled between the finger and the sharp member with tension to facilitate cutting of the fishing line.

3. A fishing line cutter comprising
   a body member mountable to a fishing rod, the body member having a first end and a second end,
   a protector member connected to the body member and having a first end disposed adjacent the first end of the body member and a second end disposed adjacent the second end of the body member,
   a sharp member for cutting fishing line, the sharp member partially enclosed within the protector member with a portion exposed at one end of the protector member for cutting the line,
   each end of the body member having a pair of opposed fingers extending individually outwardly therefrom for engagement by a strap wrapped around the fingers and across a fishing rod for mounting the cutter thereto.

* * * * *